(12) United States Patent
Murao et al.

(10) Patent No.: US 11,790,634 B2
(45) Date of Patent: Oct. 17, 2023

(54) IMAGE SIGNAL PROCESSING SYSTEM, METHOD, AND PROGRAM

(71) Applicant: DENSO CORPORATION, Kariya (JP)

(72) Inventors: Toshikazu Murao, Kariya (JP); Kazuyoshi Akiba, Kariya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 17/374,146

(22) Filed: Jul. 13, 2021

(65) Prior Publication Data
US 2022/0019839 A1    Jan. 20, 2022

(30) Foreign Application Priority Data
Jul. 15, 2020    (JP) .................................. 2020-121527

(51) Int. Cl.
G06V 10/56    (2022.01)
G06V 20/56    (2022.01)
G06V 10/50    (2022.01)

(52) U.S. Cl.
CPC ............ *G06V 10/507* (2022.01); *G06V 10/56* (2022.01); *G06V 20/56* (2022.01)

(58) Field of Classification Search
None
See application file for complete search history.

(56) References Cited

U.S. PATENT DOCUMENTS

| 2008/0199074 A1 | 8/2008 | Mitsunaga |
| 2011/0235945 A1 | 9/2011 | Wakazono et al. |
| 2014/0233805 A1* | 8/2014 | Faber .................. G01W 1/00 382/104 |
| 2014/0247358 A1* | 9/2014 | Takeda ............... G06T 3/0062 348/148 |
| 2018/0035088 A1* | 2/2018 | Nose .................... G06T 5/40 |
| 2020/0029052 A1 | 1/2020 | Murao et al. |

FOREIGN PATENT DOCUMENTS

| JP | 2002-281510 A | 9/2002 |
| JP | 2006-339994 A | 12/2006 |
| JP | 2009-065711 A | 3/2009 |
| JP | 2010-074222 A | 4/2010 |
| JP | 2011-205209 A | 10/2011 |

* cited by examiner

*Primary Examiner* — Idowu O Osifade
(74) *Attorney, Agent, or Firm* — MASCHOFF BRENNAN

(57) ABSTRACT

A first tone curve referred to in generating an image recognition processing signal as an image output signal for image recognition processing and a second tone curve referred to in generating a visual recognition signal as an image output signal for visual recognition are separately generated. The second tone curve for visual recognition is generated by connecting a dark control point, which is a control point specified in a luminance-pixel value coordinate system corresponding to the lowest luminance portion in a luminance histogram, a light control point, which is a control point specified in the luminance-pixel value coordinate system corresponding to the highest luminance portion in the luminance histogram, and an intermediate control point, which is a control point specified in the luminance-pixel value coordinate system corresponding to an intermediate luminance portion in the luminance histogram.

15 Claims, 3 Drawing Sheets

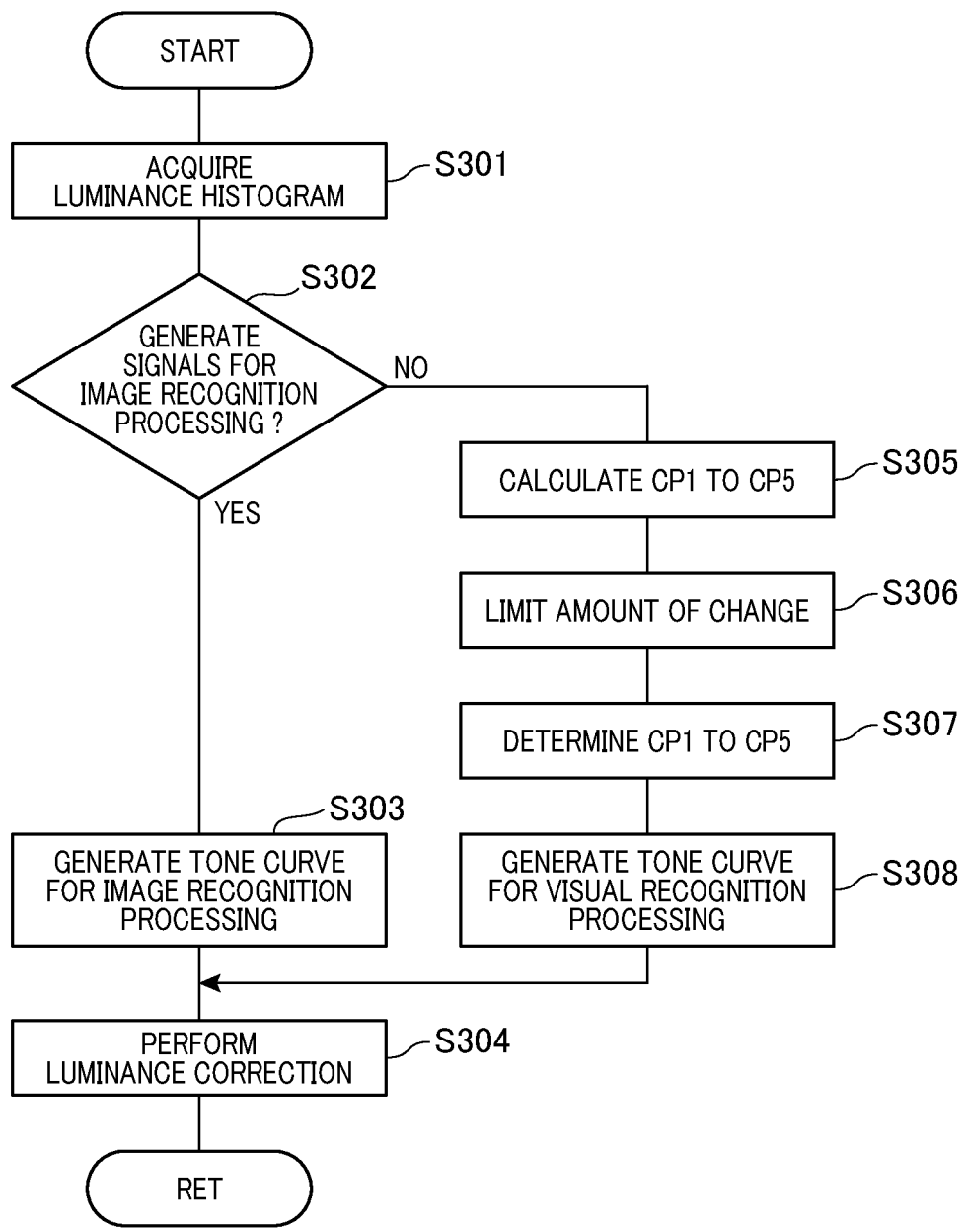

IMAGE SIGNAL PROCESSING SYSTEM, METHOD, AND PROGRAM

CROSS-REFERENCE TO RELATED APPLICATION

This patent application is based on and claims priority to Japanese Patent Application No. 2020-121527, filed on Jul. 15, 2020 in the Japan Patent office, the entire disclosure of which is hereby incorporated by reference herein.

BACKGROUND

Technical Field

The present disclosure relates to an image signal processing system, an image signal processing method, and image signal processing program for processing image signals acquired by an image capturing unit mounted on a vehicle.

Related Art

A conventional camera system mounted on a vehicle generally includes an image capturing unit and an image processor. The image capturing unit captures multiple frame images in a prescribed cycle. The image processor then acquires the multiple frame images from the image capturing unit and separates these frame images into frame images to be recognized (herein below simply referred to as recognition frame images) and frame images to be stored (herein below simply referred to as storage frame images). The image processor then separately outputs a separation result. The recognition frame images are then utilized in an image recognition process. The storage frame images are stored in a recording device. The recording device functions as a drive recorder that makes records of the storage frame images output from the camera system.

With such a configuration, the image capturing unit can capture both of the recognition frame images and the storage frame images. Specifically, a vehicle can be controlled by using the recognition frame images on the one hand. On the other hand, when an event related to a behavior of the vehicle occurs, storage frame images captured by the camera system at the time of the event can be recorded in association with the event. Accordingly, complexity of a structure of the vehicle can be suppressed or reduced in this way, thereby allowing the vehicle weight to be reduced. Accordingly, complexity of a structure of the vehicle can be suppressed or reduced in this way, thereby allowing the vehicle weight to be reduced.

In this type of an image processing system, however, two different processing are necessarily applied respectively to image signals both in an image recognition process to detect a target or the like and in a visual recognition process to visually recognize an image by sight using a drive recorder, for example. Hence, an image signal subjected to processing suitable for the image recognition is not necessarily suitable for the visual recognition sometimes.

The present disclosure has been made to address the above-described problem, and it is an object of the present disclosure to provide an image signal processing system, an image signal processing method, and image signal processing program capable of processing an image signal acquired by an in-vehicle image capturing unit to be suitable not only to image recognition but also to visual recognition, for example.

SUMMARY

Accordingly, one aspect of the present disclosure provides a novel image signal processing system that processes image signals of frame images repeatedly acquired in given cycles by an image capturing unit mounted on an own vehicle. The image signal processing system includes a histogram acquirer to acquire a luminance histogram representing frequencies of luminance of the image signal as acquired and a tone curve generator to separately generate first and second tone curves different from each other based on the luminance histogram acquired by the histogram acquirer. The first and second tone curves is drawn in a coordinate system with a vertical axis representing a pixel value and a horizontal axis representing the luminance.

The image signal processing system further includes an output signal generator to generate and output image recognition processing signals utilized in image recognition processing, based on an image signal of a subsequent frame image subsequently acquired, by applying luminance correction to the image signal with reference to the first tone curve generated by the tone curve generator. The output signal generator generates and outputs visual recognition signals utilized in visual recognition by sight, based on the image signal of the frame image by applying luminance correction to the image signal with reference to the second tone curve generated by the tone curve generator. The tone curve generator generates the second tone curve by connecting, in series, a dark portion control point specified in the coordinate system corresponding to the lowest luminance in the luminance histogram, a light portion control point specified in the coordinate system corresponding to the highest luminance in the luminance histogram, and an intermediate control point specified in the coordinate system corresponding to an intermediate luminance in the luminance histogram with each other.

Another aspect of the present disclosure provides a novel method of processing an image signal of a frame image. The method includes the steps of: acquiring the image signal of the frame image from an image capturing unit mounted on an own vehicle; acquiring a luminance histogram representing frequencies of luminance of the image signal as acquired; and generating a first tone curve based on the luminance histogram as acquired. The first tone curve is drawn in a coordinate system with a vertical axis representing a pixel value and a horizontal axis representing the luminance. The first tone curve is referred to in generating signals for image recognition processing.

The method further includes the steps of: specifying a dark portion control point in the coordinate system corresponding to the lowest luminance in the luminance histogram; specifying a light portion control point in the coordinate system corresponding to the highest luminance in the luminance histogram; and specifying an intermediate control point in the coordinate system corresponding to an intermediate luminance in the luminance histogram.

The method further includes the step of generating a second tone curve separately from the first tone curve, by connecting the dark portion control point, the intermediate control point, and the light portion control point in series, the second tone curve being used in generating signals for visual recognition by sight.

The method further includes the steps of: generating a first output image signal based on an image signal of a next frame image subsequently acquired, by applying luminance correction to the image signal with reference to the first tone curve; and generating a second output image signal based on the image signal of the next frame image by applying luminance correction to the image signal with reference to the second tone curve. The method further includes the step of outputting the first output image signal to an image recognition processer 83 and the second output image signal to a recording unit.

Yet another aspect of the present disclosure provides a novel computer readable program performing the above-described method of processing an image signal of a frame image when read by a computer.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIG. 3 is a flowchart illustrating a specific exemplary operation of an image signal processor illustrated in FIG. 1 according one embodiment of the present disclosure.

DETAILED DESCRIPTION

Figure 1:
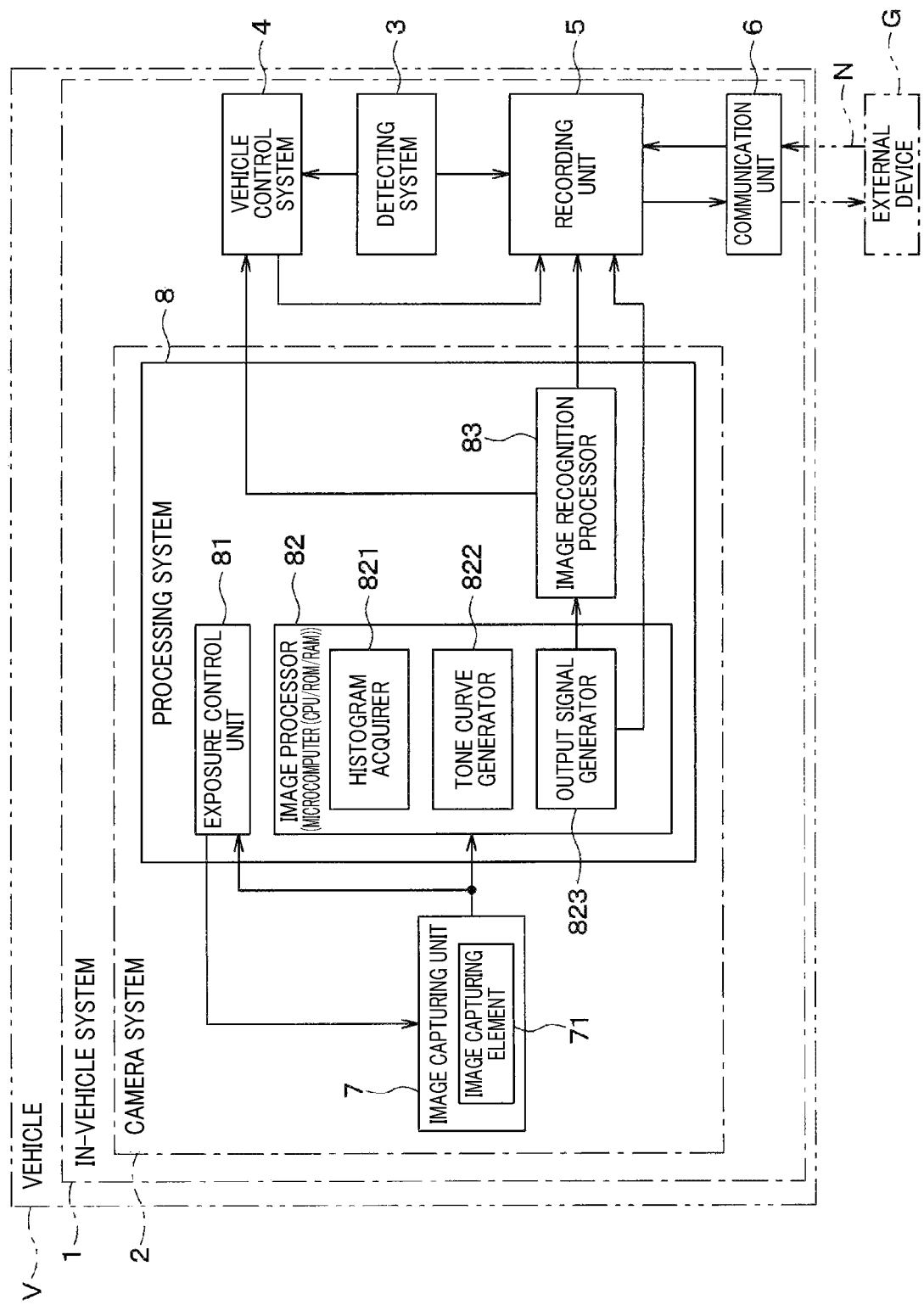
FIG. 1 is a block diagram schematically illustrating a configuration of an in-vehicle system mounted on a vehicle equipped with an image signal processing system according to one embodiment of the present disclosure.

Referring now to the drawings, wherein like reference numerals designate identical or corresponding parts throughout the several views thereof, and to FIG. 1, an exemplary configuration of an in-vehicle system is described. As illustrated there, a vehicle V is equipped with an in-vehicle system 1. The in-vehicle system 1 includes a camera system 2, a detecting system 3, and a vehicle control system 4. The in-vehicle system 1 also includes a recording unit 5 and a communication unit 6.

The camera system 2 captures images of scenery around the vehicle V (for example, forward and/or backward thereof) and outputs output image signals as an image capturing result to the recording unit 5. The camera system 2 also recognizes images of targets around the vehicle V based on the image capturing result and outputs an image recognition result to both of the vehicle control system 4 and the recording unit 5. A configuration of the camera system 2 will be detailed later.

The detecting system 3 detects a condition and a behavior of the vehicle V. Hence, the detecting system 3 includes various detectors including an acceleration detector, a vehicle speed detector, and a positioning detector. The detecting system 3 also includes a steering angle detector, a yaw rate detector, and a temperature detector. The detecting system 3 also includes a door locking-unlocking detection detector, a radar detector, and a super sound wave detector. The detecting system 3 outputs either information or a signal corresponding to the state or the behavior of the vehicle V detected by each of the various detectors to both of the vehicle control system 4 and the recording unit 5.

The vehicle control system 4 performs driving control, such as acceleration, braking, steering, etc., based on either information pieces and/or signals output from the camera system 2 and/or the detecting system 3. The vehicle control system 4 also performs automated driving control in the vehicle V based on either information pieces or signals output from both of the camera system 2 and the detecting system 3. Here, the automated driving control performs various controls including driver assistance equivalent to a first level standardized by SAE J3016 published by the Society of Automotive Engineers (SAE) International, advanced driver assistance equivalent to a second level thereof, and autonomous driving equivalent to a $3^{rd}$ level or higher thereof. That is, the in-vehicle system 1 is a system equivalent to either the automated driving system or the autonomous driving system of the SAE J3016.

The recording unit 5 is a rewritable device and makes records of either a predetermined capacity of information or signals output from at least one of the camera system 2, the detecting system 3, and the vehicle control system 4. That is, the recording unit 5 functions as a drive recorder by cooperating with the camera system 2. Also, the recording unit 5 functions as an event data recorder that records information representing a behavior of the vehicle V by incorporating with each of the detecting system 3 and the vehicle control system 4.

As shown, the in-vehicle system 1 is connected to an external device G disposed outside of the vehicle V and is able to perform information communication therewith via a communication line N. Specifically, the communication unit 6 is mounted on the in-vehicle system 1 to perform information communication between the in-vehicle system 1 and the external device G via the communication line N.

Here, the external device G may be a communication partner in Vehicle-to-Everything (V2X) communication. Specifically, the external device G may be a server system installed in a MaaS (Mobility as a Service) platform that provides a mobile service. Alternatively, the external device G may be a portable terminal, for example, a smartphone possessed by an occupant in a passenger compartment of the vehicle V. The communication unit 6 is able to allow multiple types of external devices G to connect to the in-vehicle system 1 either one after another or at the same time.

Next, an exemplary camera system will be herein below described more in detail with reference to FIG. 1. As shown, the camera system 2 includes an image capturing unit 7 and a processor 8. The image capturing unit 7 captures multiple frame images at different timings in a prescribed cycle by using an image capturing element 71, such as a CMOS (Complementary Metal Oxide Semiconductor) image detector, etc.

The processing system 8 serves as a so-called camera ECU (Electric Control Unit) and controls an image capturing process performed by the image capturing unit 7. The processing system 8 applies various processing to image signals generated by the image capturing process. In this embodiment, the processing system 8 is composed of a so-called in-vehicle microcomputer that includes a CPU (Central Processing Unit), a ROM (Read Only Memory), and a re-writable nonvolatile memory (not illustrated). The in-vehicle microcomputer further includes a RAM (Random Access Memory) and an input/output interface or the like (not illustrated). The re-writable nonvolatile memory is composed of a computer-readable non-transitionary tangible storage medium, such as a hard disk, an EEPROM (Electrically Erasable Programmable Read-Only Memory), a flash ROM, etc.

As described earlier, the processing system 8 of the present disclosure acting as the image signal processing system and performing an image signal processing method processes image signals acquired by the image capturing unit 7. Specifically, in this embodiment, the processing system 8 is able to control exposure performed in the image capturing unit 7 and to apply various processes to image signals output from the image capturing unit 7. Hence, the processing system 8 includes an exposure control unit 81, an image processor 82, and an image recognition processor 83.

The exposure control unit 81 controls exposure of the image capturing element 71 based on an ambient illuminance of a vehicle V acquired from the detecting system 3 and/or an image signal output from the image capturing unit 7. However, a conventional device can be employed as the exposure control unit 81.

Further, the image processor 82 processes image signals acquired from the image capturing unit 7 and generates and outputs image recognition processing signals and visual recognition signals as processing resultant signals. The image recognition processing signal serves as an output image signal subjected to image recognition processing performed by the image recognition processor 83. The visual recognition signal is an output image signal utilized in visual recognition in the drive recorder. That is, the image processor 82 separately generates the output image signal subjected to image recognition processing and the output image signal provided to the drive recorder (i.e., a recording function) based on image signals acquired by the common image capturing unit 7.

Here, the image processor 82 includes a histogram acquirer 821, a tone curve generator 822, and an output signal generator 823 collectively correcting luminance of an image signal. In this embodiment, functions of the histogram acquirer 821, the tone curve generator 822, and the output signal generator 823 are achieved by the in-vehicle microcomputer.

Specifically, the histogram acquirer 821 is able to obtain a luminance histogram indicating a frequency distribution of luminance of an image signal acquired from the image capturing unit 7. More specifically, the histogram acquirer 821 generates the luminance histogram of a luminance of each of pixels included in the image signal acquired from the image capturing unit 7. The tone curve generator 822 is able to generate a tone curve utilized in luminance correction as image signal processing, based on the luminance histogram acquired by the histogram acquirer 821. The output signal generator 823 is able to apply luminance correction to image signals with reference to the tone curve generated by the tone curve generator 822, and to generate respective output image signals for image recognition and drive recording in the drive recorder.

Hence, the tone curve generator 822 separately generates tone curves for image recognition processing and visual recognition, respectively. The tone curve for image recognition processing is utilized to generate an image recognition processing signal. By contrast, the visual recognition tone curve is utilized in generating a visual recognition signal. The visual recognition tone curve has a different characteristic from that the tone curve for image recognition processing has.

Figure 2:
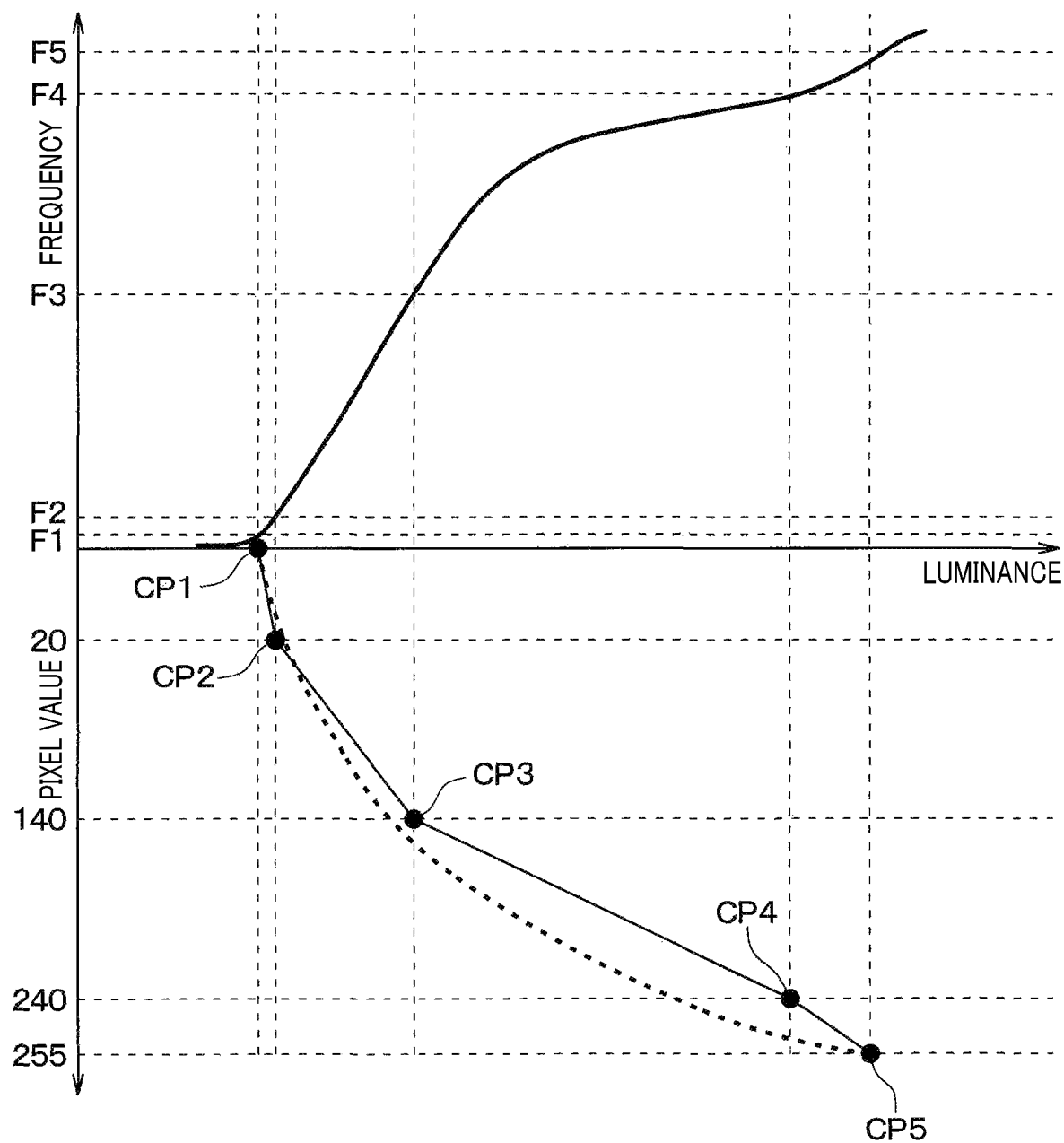
FIG. 2 is a graph illustrating one example of a tone curve generated by a tone curve generator illustrated in FIG. 1 according one embodiment of the present disclosure.

FIG. 2 illustrates a relationship between a luminance histogram and tone curves, in which a horizontal axis shows the luminance. As shown there, a graph drawn in an upper side than the horizontal axis of FIG. 2 illustrates the luminance histogram. A vertical axis indicated by an upward arrow in the upper side graph indicates a frequency (i.e., a cumulative frequency ratio). Further, a graph drawn in a lower side than the horizontal axis of FIG. 2 illustrates tone curves. In the lower side graph, a vertical axis indicated by a downward arrow illustrates a pixel value represented by eight bits (i.e., numeral values 0 to 255). Among these tone curves, a dotted line indicates a tone curve for image recognition processing. A solid line represents a tone curve for visual recognition.

Hence, the tone curve generator 822 is able to determine (i.e., identify or specify) lower and upper limits of luminance in the luminance histogram and to generate a tone curve based thereon to cause a tone to be constant for image recognition processing. By contrast, the tone curve generator 822 specifies multiple points (herein below referred to as control points) in a coordinate system shown by the lower side graph of FIG. 2 based on the luminance histogram, and then generates a tone curve that smoothly connects these control points in series for visual recognition. Specifically, control points serve as points generating a curve when connected to each other.

For example, the visual recognition tone curve is generated by connecting five control points composed of from dark portion control points CP1 to light portion control point CP5 to pass through these points as illustrated in FIG. 2. Then, the tone curve generator 822 generates the visual recognition tone curve by smoothly connecting the five control points as determined by applying one of gamma processing, spline processing, and log processing or the like.

Here, as illustrated in FIG. 2, the dark portion control point CP1 is a control point specified in the coordinate system corresponding to the lowest luminance portion in the luminance histogram. Specifically, a lowest pixel value of about 0 (zero) is assigned to the dark portion control point CP1 corresponding to frequency F1 (for example, about 0.5%) in the luminance histogram.

Further, the dark portion control point CP2 is an additional control point positioned close to the dark portion control point CP1 in a higher luminance side portion than the lowest luminance portion of the luminance histogram. Specifically, the dark portion control point CP2 is specified in the coordinate system corresponding to a frequency F2 (for example, about 5%) in the luminance histogram, and a pixel value of 20 is thereby assigned thereto.

The control point CP3 is an intermediate control point specified in the coordinate system corresponding to an intermediate luminance portion in the luminance histogram. The intermediate control point CP3 corresponds to a frequency F3 (for example, about 50%) in the luminance histogram, and a pixel value of 140 is thereby assigned thereto.

Further, the light portion control point CP4 is an additional control point positioned close to the light portion control point CP5 in a lower luminance side portion than a maximum luminance portion in the luminance histogram. Specifically, the light portion control point CP4 is specified in the coordinate system corresponding to a frequency F4 (for example, 95%), and a pixel value of 240 is thereby assigned thereto.

Further, the light portion control point CP5 is a control point positioned corresponding to the highest luminance portion in the luminance histogram. Specifically, the light portion control point CP5 is specified in the coordinate system corresponding to a frequency F5 (for example, about 99.5%) in the luminance histogram, and a highest pixel value of 255 is thereby assigned thereto.

For example, since a luminance level of a traffic signal is high and is located at a right side in the histogram corresponding to either the CP4 or the CP5, either the pixel value of 240 or that of 255 is assigned thereto to maintain visibility thereof.

Hence, the pixel value of the CP1 is calculated by adding a given amount of offset to a lower limit of a histogram, thereby obtaining zero, for example. The pixel value of the CP2 is calculated by multiplying accumulation (e.g., an integrated value) of the histogram by a given rate ranging from above 0% to 50%. Further, the pixel value of the CP3 is calculated by averaging the histogram. The pixel value of the CP4 is calculated by multiplying accumulation (e.g., an integrated value) of the histogram by a given rate ranging from above 50% to below 100%. The pixel value of the CP5 is calculated by adding a given amount of offset to an upper limit of the histogram, thereby obtaining 255, for example.

Here, when a luminance histogram changes, and accordingly control points frequently varies, flicker occurs on a screen. Hence, to avoid such flicker on the screen, the tone curve generator 822 limits an amount of change in control point accompanying a change in luminance histogram. Specifically, the tone curve generator 822 limits an amount of change in each of the dark and light portion control points (CP1 to CP5) to a given level by using a well-known method, such as low-pass filtering, temporal low pass filtering, guard processing, etc.

For example, if a luminance of scenery changes suddenly when a vehicle passes through a shade of a tree, a building shadow, a shade made by a passing truck, and a tunnel or the like, and accordingly a shape of a histogram and CP points calculated based thereon rapidly changes, a visibility of an image of the scenery deteriorates at the time. Hence, a sudden change in CP point is suppressed.

Further, as illustrated in FIG. 1, The output signal generator 823 is able to generate signals for image recognition processing with reference to the tone curve for image recognition processing and to output the signals as generated for the image recognition processing to the image recognition processor 83. The image recognition processor 83 then performs an image recognition process of recognizing an image of a target within an image capturing range of the image capturing unit 7 by using the image recognition processing signals output from the image processor 82. Then, the image recognition processor 83 outputs a result of performing the image recognition process to both of the vehicle control system 4 and the recording unit 5.

Also, the output signal generator 823 is able to generate signals for visual recognition with reference to the tone curve for visual recognition different from the tone curve for image recognition processing, and to output the signals as generated for visual recognition to the recording unit 5. That is, the output signal generator 823 generates the signals for visual recognition used in the drive recorder. The signals for visual recognition are then transmitted from the recording unit 5 to either the external device G or an image display installed in a vehicle cabin, not illustrated, and visually recognized.

Next, an exemplary operation of each of the image signal processing system, method, and program according to one embodiment of the present disclosure will be herein below described with reference to applicable drawings.

That is, the image capturing element 71 disposed inside of the image capturing unit 7 initially captures multiple frame images in a prescribed cycle at different timings. For example, the frame images may be captured at a frame rate of about 10 to 60 (ten to sixty) times per second. Specifically, the image capturing unit 7 may capture the number of 40 frame images per second, each at equal intervals of 25 ms.

The processing system 8 then processes image signals of the frame images as acquired by the image capturing unit 7. Specifically, the processing system 8 reads image signal processing program stored either in the ROM or in the nonvolatile re-writable memory and causes the CPU to run the program and process the image signals as output from the image capturing unit 7.

More Specifically, the image processor 82 acquires multiple frame images acting as image signals from the image capturing unit 7. Then, the image processor 82 then processes the frame images as acquired and generates frame images serving as image recognition processing signals for image recognition (i.e., output image signals utilized in image recognition processing). At the same time, the image processor 82 processes the frame images as acquired and generates frame images serving as visual recognition signals for storage (i.e., output image signals for visual recognition), separately from the frame images for image recognition.

The image processor 82 then separately outputs the frame images utilized for image recognition processing and the frame images to be stored in the recording unit 5 and accordingly utilized in visual recognition by sight. After that, the frame images output from the image processing system 82 for storage is then stored in the recording unit 5. Subsequently, the image recognition processor 83 performs the recognition process of recognizing a target included in the image capturing range of the image capturing unit 7 based on the recognition frame images output from the image processor 82. A result of the image recognition processing performed by the image recognition processor 83 is then output to both of the vehicle control system 4 and the recording unit 5.

Next, luminance correction performed as image signal processing by the image processor 82 of the processing system 8 will be described herein below in detail. In the image processor 82, a well-known process other than the luminance correction, such as black level subtraction, HDR (High Dynamic Range) elongation, demosaic processing, etc., may be also executed at the same time as needed.

First, the histogram acquirer 821 acquires (i.e., generates) a luminance histogram based on image signals acquired by the image capturing unit 7. The tone curve generator 822 then generates a tone curve based on the luminance histogram as acquired (i.e., generated) by the histogram acquirer 821. The output signal generator 823 then corrects luminance of the image signals with reference to the tone curve as generated and generates output image signals as a result of luminance correction based thereon. More specifically, the output signal generator 823 separately generates output image signals for image recognition processing (i.e., subjected to image recognition processing) and output image signals for visual recognition by sight.

Here, different image signal processing are respectively required for the image signals for image recognition to detect a target and the image signals for visual recognition by sight. That is, as described earlier, an image signal subjected to a process suitable for image recognition may not be necessarily suitable for visual recognition. That is, when a dark area of the image signal is corrected to be brighter, for example, although target recognition accuracy is improved, quality of a display image diverges from an actual appearance and may not be suitable for visual recognition by sight.

Hence, the tone curve generator 822 separately generates a tone curve provided for generating signals for image recognition processing and a tone curve utilized in generating signals provided for visual recognition by sight, differently. Then, the output signal generator 823 generates signals for image recognition processing with reference to the tone curve for image recognition processing, and outputs the signals for image recognition processing as generated to the image recognition processor 83. At the same time, the output signal generator 823 generates signals for visual recognition by sight with reference to the tone curve for visual recognition, and outputs the signals as generated for visual recognition to the recording unit 5. Hence, based on the image signals acquired by the common image capturing unit 7, output image signals subjected to the image recognition processing and output image signals provided to the drive recorder (i.e., the drive recording function) can be appropriately generated.

More specifically, as described earlier, the tone curve generator 822 determines the luminance lower and upper limits in the luminance histogram and generates a tone curve based on the determination to cause the tone to be constant for image recognition processing. Hence, frame images as output image signals subjected to image recognition processing can be preferably accurately recognized. However, since it is sensed that a contrast of the frame image for image recognition is low when it is visually recognized by sight, it does not suit visual recognition.

Then, as described earlier, the tone curve generator 822 determines and specifies five control points of from the dark portion control point to the light portion control point (CP1 to CP5) based on the luminance histogram as illustrated in FIG. 2. Then, the tone curve generator 822 generates a tone curve for visual recognition by smoothly connecting these five control points in series one by one by applying one of gamma processing, spline processing, and log processing or the like.

Here, the minimum pixel value of 0 (zero) is assigned to the dark portion control point CP1 corresponding to the minimum luminance portion in the luminance histogram to avoid a pedestrian in black clothes from being visually recognized to be a solid black, for example. Further, the low pixel value of 20 is assigned to the dark portion control point CP2 corresponding to a low frequency range (for example, 5%) in the higher luminance portion than the lowest luminance portion of the luminance histogram to locate the dark portion control point CP2 at a position close to the dark portion control point CP1. With this, visibility in a dark portion, such as a shadow, a tunnel, etc., and at night can be preferably ensured.

Further, to entirely ensure visibility of the screen, the intermediate pixel value of 140 is assigned to the intermediate control point CP3 corresponding to the intermediate luminance portion of the luminance histogram. Further, a high pixel value of 240 is assigned to the light portion control point CP4 to locate the light portion control point CP4 at a position close to the light portion control point CP5 corresponding to the high frequency range (for example, 95%) in the lower luminance side than the maximum luminance portion of the luminance histogram. With this, visibility at a light portion, such as a traffic signal light, a tunnel outlet, a vehicle lamp, a streetlight, etc., can be preferably ensured. Further, a maximum pixel value of 255 is assigned to the light portion control point CP5 corresponding to the maximum luminance portion in the luminance histogram not to cause saturation of an image.

Hence, as described heretofore, according to this embodiment, the tone curve for visual recognition is differently generated from the tone curve for image recognition processing by connecting the several points from the dark portion control point to the light control poison (CP1 to CP5). As a result, visibility of the frame images serving as output image signals provided to the drive recorder (i.e., drive recording function) for storage is upgraded. Specifically, visibility at night can be preferably ensured while preventing a traffic signal light and a number plate of another vehicle from becoming saturated.

Furthermore, according to this embodiment, the tone curve generator 822 limits an amount of change in control points accompanying a change in luminance histogram. With this, it is possible to avoid flicker of the screen generally caused by frequent fluctuation in control points.

Further, the visual signal generated with reference to the tone curve for visual recognition may be transmitted to an image display installed in the vehicle cabin (not illustrated), and is preferably utilized as the output image signal for the drive recorder. Alternatively, such a visual recognition signal may be transmitted to an external device G as a portable terminal brought into the cabin of the vehicle V, and is preferably utilized as the output image signal for the drive recorder. Further, such a visual recognition signal may be preferably utilized as MaaS data to generate a map and/or detect a dropped object and a disabled vehicle or the like when it is sent to a server computer as an external device G.

Hereinafter, exemplary operation of the CPU (not illustrated) disposed in the processing system 8 to function as the image processor 82 will be described with reference to a flowchart illustrated in FIG. 3.

First, in step S301, when frame images are acquired from the image capturing unit 7, the CPU acquires (i.e., generates) and stores a luminance histogram either in the non-volatile memory or in the RAM. In step S302, the CPU determines whether to perform image signal processing to generate signals for image recognition processing in this instance.

When it is determined that image signal processing is performed in this instance to generate signals for image recognition processing (i.e., Yes, in step S302), the CPU advances the process to step S303. In step S303, the CPU generates and stores a tone curve for image recognition processing either in the non-volatile memory or in the RAM. In step S304, the CPU performs luminance correction with reference to the tone curve generated in step S303 for image recognition processing. Then, after performing the luminance correction process in step S304, the CPU temporarily terminates the processes illustrated in FIG. 3.

By contrast, when image signal processing is performed in this instance to generate signals for visual recognition (i.e., No, in step S302), the CPU advances the process one by one from step S305 to step S308. That is, in step S305, the CPU calculates and specifies points in a luminance-pixel value coordinate system one by one from a dark portion control point to a light portion control point (CP1 to CP5) based on the luminance histogram acquired in this instance and stores these points either in the non-volatile memory or in the RAM.

In step S306, the CPU limits an amount of change in each of the points of from the dark portion control point to the light portion control point (CP1 to CP5). Here, as described earlier, a well-known method, such as low-pass filtering, slowdown calculation processing, guard processing, etc., may be utilized to limit the amount of change in each of the points CP1 to CP5. Subsequently, in step S307, the control points of from the dark portion control point to the light portion control point (CP1 to CP5) generating the tone curve applied to the frame images acquired in this instance are determined for visual recognition. Then, the control points of from the dark portion control points to the light portion control point (CP1 to CP5) determined in step S307 are stored either in the non-volatile memory or in the RAM.

Specifically, as described earlier, a pixel value of the CP1 is calculated by adding a given amount of offset to a lower limit of a histogram, thereby obtaining zero, for example. A pixel value of the CP2 is calculated by multiplying accumulation (e.g., an integrated value) of the histogram by a given rate ranging from above 0% to 50%. A pixel value of the CP3 is calculated by averaging the histogram. A pixel value of the CP4 is calculated by multiplying accumulation (e.g., an integrated value) of the histogram by a given rate ranging from above 50% to below 100%. A pixel value of the CP5 is calculated by adding a given amount of offset to an upper limit of the histogram, thereby obtaining 255, for example.

Subsequently, when the control points of from the dark portion control point to the light portion control point (CP1 to CP5) are determined in step S307, the CPU advances the process to step S308. In step S308, the CPU generates a tone curve for visual recognition by connecting the points of from the dark portion control points to the light portion control point (CP1 to CP5) determined in step S307 one by one and stores the tone curve for visual recognition either in the non-volatile memory or in the RAM. In step S304, the CPU performs luminance correction with reference to the tone curve for visual recognition generated in step S308. Then, after executing the process of step S304, the CPU terminates the processes illustrated in FIG. 3.

The present disclosure is not limited to the above-described embodiments and includes variants as described herein below, wherein description of the above-described embodiment may be appropriately incorporated by reference to the below described components or devices having the same reference numerals unless it causes a technical contradiction or is specifically added.

First, the image capturing unit 7 and the processing system 8 can be accommodated substantially in the same housing. Alternatively, the image capturing unit 7 and the processing system 8 can be separately accommodated in respective housings.

Further, the processing system 8 can be composed of a digital circuit, such as an ASIC (Application Specific Integrated Circuit), an FPGA (Field Programmable Gate Array), etc., able to perform the above-described operation. Hence, the processing system 8 can employ both of the in-vehicle microcomputer and the digital circuit at the same time.

Further, the processing system 8 can only include the image processor 82. In such a situation, the image processor 82 can act as the processing system 8 (i.e., an image signal processing system) that performs an image signal processing method of the present disclosure. Specifically, the exposure control unit 81 can be disposed in the image capturing unit 7. Also, the image recognition processor 83 can be disposed in either the detecting system 3 or the vehicle control system 4 arranged outside of the processing system 8.

Further, in the above-described embodiment, the histogram acquirer 821 generates (i.e., calculates) the luminance histogram based on the image signals acquired by the image capturing unit 7. However, the present disclosure is not limited to such a histogram acquirer 821. That is, the camera system 2 can employ a histogram generator that generates (i.e., calculates) a luminance histogram independently from the histogram acquirer 821. In such a situation, the histogram acquirer 821 can receive a result of generation of the luminance histogram from the histogram generator.

Further, programs performing the above-described various operations, procedures, and processes can be downloaded and upgraded via V2X communication. Alternatively, such programs can be downloaded or upgraded via a terminal disposed in an automobile manufacturing factory, an automobile maintenance shop, and a car dealer or the like. Further, storage to store such program can be a memory card, an optical disk, a magnetic disk, or the like.

Further, each of the above-described functions and methods can be achieved by a dedicated computer composed of a processor programed to perform one or more functions and a memory. Alternatively, each of the above-described functions and methods can be achieved by a dedicated computer composed of a processor prepared by using one or more dedicated hardware logical circuits. Otherwise, each of the above-described functions and methods can be achieved by one or more dedicated computers composed of a combination of a processor programed to perform one or more functions, a memory, and another processor composed of one or more hardware logical circuits.

Further, the computer program can be stored in a computer-readable non-transitory tangible storage medium as instructions executed by the computer. That is, each of the above-described functions and methods can be achieved by either computer program that determines a procedure of achieving the functions and methods or a non-transitory tangible storage medium that stores the program.

Furthermore, the present disclosure is not limited to the above-described specific operation system. For example, the tone curve for visual recognition shown in FIG. 2 can be generated by connecting one or more additional control points to the control points of from the dark portion control point to the light portion control point CP1 to CP5.

Further, the frequency F1 corresponding to the dark portion control point CP1 is not limited to about 0.5%. That is, the frequency F1 can be from about 0.1% to about 1%, for example. Similarly, the frequencies F2 to F5 can be appropriately changed to other frequencies from the above-described specific examples. Further, the intermediate control point CP3 can be a control point corresponding to a luminance average value of the luminance histogram.

As described heretofore, according to one embodiment of the present disclosure, an image signal processing system (8) of processing an image signal of a frame image acquired by an image capturing unit (7) mounted on a vehicle (V) comprises: a histogram acquirer (821) to acquire a luminance histogram representing frequencies of luminance of the image signal; a tone curve generator (822) to generate a tone curve based on the luminance histogram acquired by the histogram acquirer; and an output signal generator (823) to generate an output image signal by applying luminance correction to the image signal with reference to the tone curve generated by the tone curve generator. The tone curve generator separately generates: a first tone curve generating a image recognition processing signals utilized in image recognition processing, and a second tone curve different from the first tone curve, the second tone curve generating visual recognition signals utilized in visual recognition by sight. The tone curve generator generates the second tone curve by connecting, in series, a dark portion control point specified in the coordinate system corresponding to the lowest luminance in the luminance histogram, a light portion control point specified in the coordinate system corresponding to the highest luminance in the luminance histogram, and an intermediate control point specified in the coordinate system corresponding to an intermediate luminance in the luminance histogram.

Further, the second tone curve is generated passing through a first additional control point located closer to the dark portion control point than to the middle and light portion control points. The first additional control point is specified in the coordinate system corresponding to a higher luminance portion than the lowest luminance portion in the luminance histogram.

Further, the tone curve generator generates the second tone curve passing through a second additional control point closer to the light portion control point than to the middle and dark portion control points. The second additional control point is specified in the coordinate system corresponding to a lower luminance portion than the highest luminance portion in the luminance histogram.

Further, the tone curve generator limits an amount of change in each of the control points accompanying a change in luminance histogram. Further, the tone curve generator generates the second tone curve by connecting each of the control points using either gamma processing or spline processing. Furthermore, the visual signal generated by the output signal generator is recorded in a drive recorder and visually recognized by sight.

Further, the image signal processing system is disposed in an external device (G) located outside of a vehicle. The external device (G) is connected to an in-vehicle system (1) mounted on the vehicle via a communication line (N). The visual signal generated by the output signal generator is transmitted to the external device (G) via the communication line (N).

According to another embodiment of the present disclosure, a method of processing an image signal of a frame image comprises the steps of: acquiring the image signal of a frame image from an image capturing unit (7) mounted on a vehicle (V); acquiring a luminance histogram representing frequencies of luminance of the image signal; and generating a first tone curve used in generating signals for image recognition processing, based on the luminance histogram as acquired. The method further comprises the steps of: generating a first output image signal generated with reference to the first tone curve; calculating and specifying a dark portion control point corresponding to the lowest luminance in the luminance histogram; and calculating and specifying a light portion control point corresponding to the highest luminance in the luminance histogram. The method further comprises the steps of: calculating and specifying an intermediate control point corresponding to an intermediate luminance in the luminance histogram; generating a second tone curve used in generating signals for visual recognition by sight differently and separately from the first tone curve by connecting these control points in series with each other; and generating a second output image signal by applying luminance correction to the image signal generated with reference to the second tone curve.

According to yet another embodiment of the present disclosure, a computer readable program performing the above-described method of processing an image signal of a frame image when read by a computer.

Numerous additional modifications and variations of the present disclosure are possible in light of the above teachings. It is therefore to be understood that within the scope of the appended claims, the present disclosure may be performed otherwise than as specifically described herein. For example, the present disclosure is not limited to the above-described image signal processing system and may be altered as appropriate. Further, the present disclosure is not limited to the above-described image signal processing method and may be altered as appropriate. Furthermore, the present disclosure is not limited to the above-described computer readable program and may be altered as appropriate.

What is claimed is:

1. An image signal processing system of processing image signals of frame images repeatedly acquired in given cycles by an image capturing unit mounted on an own vehicle, the image signal processing system comprising:
   a histogram acquirer to acquire a luminance histogram representing frequencies of luminance of an image signal as acquired;
   a tone curve generator to separately generate first and second tone curves different from each other based on the luminance histogram acquired by the histogram acquirer, the first and second tone curves being drawn in a coordinate system with a vertical axis representing a pixel value and a horizontal axis representing the luminance, and
   an output signal generator to generate and output image recognition processing signals utilized in image recognition processing, based on an image signal of a subsequent frame image subsequently acquired, by applying luminance correction to the image signal with reference to the first tone curve generated by the tone curve generator,
   the output signal generator generating and outputting visual recognition signals utilized in visual recognition by sight, based on the image signal of the frame image by applying luminance correction to the image signal with reference to the second tone curve generated by the tone curve generator,
   wherein the tone curve generator generates the second tone curve by connecting in series:
   a dark portion control point specified in the coordinate system corresponding to a lowest luminance in the luminance histogram,
   a light portion control point specified in the coordinate system corresponding to a highest luminance in the luminance histogram, and
   an intermediate control point specified in the coordinate system corresponding to an intermediate luminance in the luminance histogram with each other.

2. The image signal processing system as claimed in claim 1, wherein the tone curve generator further generates a first additional control point based on the luminance histogram, the first additional control point being specified in the coordinate system at a position closer to the dark portion control point than to the intermediate control point corresponding to a higher luminance portion than a lowest luminance portion in the luminance histogram,
   wherein the second tone curve passes through the first additional control point.

3. The image signal processing system as claimed in claim 1, wherein the tone curve generator generates the second tone curve passing through a second additional control point closer to the light portion control point than to the, the second additional control point being specified in the coordinate system corresponding to a lower luminance portion than a highest luminance portion in the luminance histogram.

4. The image signal processing system as claimed in claim 1, wherein the tone curve generator limits an amount of change to a give level in generating each of the control points accompanying a change in luminance histogram.

5. The image signal processing system as claimed in claim 1, wherein the tone curve generator generates the second tone curve by connecting each of the control points by applying either gamma processing or spline processing to the each of the control points.

6. The image signal processing system as claimed in claim 1, wherein the output signal generator outputs the visual recognition signals to a drive recorder to make a record in the drive recorder and to be visually recognized by sight.

7. The image signal processing system as claimed in claim 1, wherein the output signal generator transmits the visual recognition signals to an external device located outside of the own vehicle via a communication line,
the external device having substantially the same image signal processing system as the own vehicle,
the external device being connected to an in-vehicle system mounted on the own vehicle via the communication line.

8. A method of processing image signals of frame images, the method comprising the steps of:
acquiring an image signal of a frame image from an image capturing unit mounted on an own vehicle;
acquiring a luminance histogram representing frequencies of luminance of the image signal as acquired;
generating a first tone curve based on the luminance histogram as acquired, the first tone curve being drawn in a coordinate system with a vertical axis representing a pixel value and a horizontal axis representing the luminance, the first tone curve being referred to in generating signals for image recognition processing;
specifying a dark portion control point in the coordinate system corresponding to a lowest luminance in the luminance histogram;
specifying a light portion control point in the coordinate system corresponding to a highest luminance in the luminance histogram;
specifying an intermediate control point in the coordinate system corresponding to an intermediate luminance in the luminance histogram;
generating a second tone curve separately from the first tone curve, by connecting the dark portion control point, the intermediate control point, and the light portion control point in series, the second tone curve being used in generating signals for visual recognition by sight; and
generating a first output image signal based on an image signal of a next frame image subsequently acquired, by applying luminance correction to the image signal with reference to the first tone curve;
generating a second output image signal based on the image signal of the next frame image by applying luminance correction to the image signal with reference to the second tone curve; and
outputting the first output image signal to an image recognition processor and the second output image signal to a recording unit.

9. The method as claimed in claim 8, further comprising the steps of:
designating and specifying a first additional control point in the coordinate system at a position closer to the dark portion control point corresponding to a higher luminance portion than a lowest luminance portion in the luminance histogram; and
connecting the first additional control point with the dark portion control point, the intermediate control point, and the light portion control point to smoothen the second tone curve.

10. The method as claimed in claim 9, further comprising the steps of:
designating and specifying a second additional control point in the coordinate system at a position closer to the light portion control point corresponding to a lower luminance portion than a highest luminance portion in the luminance histogram; and
connecting the second additional control point with the dark portion control point, the first additional control point, the intermediate control point, and the light portion control point to smoothen the second tone curve.

11. The method as claimed in claim 8, further comprising the step of limiting an amount of change in each of the control points accompanying a change in luminance histogram.

12. The method as claimed in claim 8, wherein the step of generating the tone curve has a sub step of connecting each of the control points using either gamma processing or spline processing.

13. The method as claimed in claim 8, further comprising the step of recording the visual signal as generated in a drive recorder to be visually recognized by sight.

14. The method as claimed in claim 8, further comprising the step of transmitting the visual signal to an external device located outside of an own vehicle connected to an in-vehicle system mounted on the own vehicle via a communication line.

15. A computer readable program performing a method of processing an image signal of a frame image when read by a computer, the method including the steps of:
acquiring the image signal of the frame image from an image capturing unit mounted on an own vehicle;
acquiring a luminance histogram representing frequencies of luminance of the image signal as acquired;
generating a first tone curve based on the luminance histogram as acquired, the first tone curve being drawn in a coordinate system with a vertical axis representing a pixel value and a horizontal axis representing the luminance, the first tone curve being referred to in generating signals for image recognition processing;
specifying a dark portion control point in the coordinate system corresponding to a lowest luminance in the luminance histogram;
specifying a light portion control point in the coordinate system corresponding to a highest luminance in the luminance histogram;
specifying an intermediate control point in the coordinate system corresponding to an intermediate luminance in the luminance histogram;
generating a second tone curve separately from the first tone curve, by connecting the dark portion control point, the intermediate control point, and the light portion control point in series, the second tone curve being used in generating signals for visual recognition by sight; and
generating a first output image signal based on an image signal of a next frame image subsequently acquired, by applying luminance correction to the image signal with reference to the first tone curve;
generating a second output image signal based on the image signal of the next frame image by applying luminance correction to the image signal with reference to the second tone curve; and
outputting the first output image signal to an image recognition processor and the second output image signal to a recording unit.

* * * * *